US009729712B2

(12) United States Patent
Sougen et al.

(10) Patent No.: US 9,729,712 B2
(45) Date of Patent: Aug. 8, 2017

(54) ELECTRONIC DEVICE AND METHOD FOR FILTERING NOTIFICATION INFORMATION

(71) Applicant: Kabushiki Kaisha Toshiba, Minato-ku, Tokyo (JP)

(72) Inventors: Akiyoshi Sougen, Ome Tokyo (JP); Hidetoshi Yokoi, Akishima Tokyo (JP); Toshiyuki Koga, Tokyo (JP); Shingo Suzuki, Sagamihara Kanagawa (JP); Jun Ohashi, Ome Tokyo (JP); Kentaro Takeda, Tokyo (JP); Takaya Matsuno, Kunitachi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/392,898

(22) Filed: Dec. 28, 2016

(65) Prior Publication Data
US 2017/0111500 A1    Apr. 20, 2017

Related U.S. Application Data

(63) Continuation of application No. PCT/JP2014/067418, filed on Jun. 30, 2014.

(51) Int. Cl.
*H04M 1/00* (2006.01)
*H04M 3/436* (2006.01)
(Continued)

(52) U.S. Cl.
CPC ......... *H04M 3/436* (2013.01); *H04M 1/7253* (2013.01); *H04W 4/14* (2013.01);
(Continued)

(58) Field of Classification Search
CPC ......... H04M 1/72572; H04M 1/72566; H04M 1/72569; H04M 1/7253; H04M 1/72597;
(Continued)

(56) References Cited

U.S. PATENT DOCUMENTS 8,718,672 B2 * 5/2014 Xie .................. G01C 22/00
                                              455/404.1
8,948,821 B2 * 2/2015 Newham ............ H04M 19/04
                                              455/412.2
(Continued)

FOREIGN PATENT DOCUMENTS

JP    H08-163620 A    6/1996
JP    H10-200933 A    7/1998
(Continued)

OTHER PUBLICATIONS

International Search Report mailed by Japan Patent Office on Sep. 2, 2014 in the corresponding PCT Application No. PCT/JP2014/067418—3 pages.
(Continued)

*Primary Examiner* — Duc M Nguyen
(74) *Attorney, Agent, or Firm* — Knobbe, Martens, Olson & Bear LLP

(57) ABSTRACT

According to one embodiment, an electronic device, which can be fitted on a body of a user, estimates action of the user by using one or more sensors. The electronic device receives first notification information detected by an external device, and filtering information indicative of an action type for which notification of the first notification information should be permitted or prohibited. The electronic device executes, when the estimated action is of the action type for which notification of the first notification information is permitted, processing for notifying the user of the first notification information.

14 Claims, 13 Drawing Sheets

(51) Int. Cl.
*H04M 1/725* (2006.01)
*H04W 4/14* (2009.01)
*H04W 68/00* (2009.01)
*H04W 4/00* (2009.01)

(52) U.S. Cl.
CPC .... *H04M 1/72569* (2013.01); *H04M 1/72572* (2013.01); *H04M 1/72597* (2013.01); *H04M 2250/12* (2013.01); *H04W 4/008* (2013.01); *H04W 68/00* (2013.01)

(58) Field of Classification Search
CPC ......... H04M 2250/10; H04M 2250/12; H04W 4/02; H04W 4/021; H04W 4/025; H04W 4/008
USPC ... 455/41.1, 41.2, 41.3, 456.1, 456.3, 456.6, 455/567
See application file for complete search history.

(56) References Cited

U.S. PATENT DOCUMENTS

| | | | |
|---|---|---|---|
| 2002/0119788 A1* | 8/2002 | Parupudi | H04M 1/72563 455/456.1 |
| 2004/0203673 A1* | 10/2004 | Seligmann | H04M 1/72547 455/415 |
| 2005/0152325 A1* | 7/2005 | Gonzales | H04M 19/04 370/338 |
| 2007/0197195 A1 | 8/2007 | Sugiyama et al. | |
| 2009/0305744 A1* | 12/2009 | Ullrich | H04M 1/72569 455/567 |
| 2012/0117568 A1* | 5/2012 | Plotkin | G06F 9/4843 718/100 |
| 2012/0289217 A1* | 11/2012 | Riemer | H04M 1/72577 455/418 |
| 2013/0316744 A1* | 11/2013 | Newham | H04M 1/72569 455/458 |
| 2014/0154986 A1* | 6/2014 | Lee | H04B 7/26 455/41.2 |
| 2015/0325098 A1* | 11/2015 | Faaborg | G08B 21/18 340/573.1 |
| 2016/0378325 A1* | 12/2016 | Hurley | H04L 67/20 715/809 |

FOREIGN PATENT DOCUMENTS

| | | |
|---|---|---|
| JP | 2004-318747 A | 11/2004 |
| JP | 2006-031379 A | 2/2006 |
| JP | 2008-152655 A | 7/2008 |
| JP | 2014-006663 A | 1/2014 |
| WO | WO 2006/075512 A1 | 7/2006 |

OTHER PUBLICATIONS

Written Opinion mailed by Japan Patent Office on Sep. 2, 2014 in the corresponding PCT Application No. PCT/JP2014/067418 (JP only)—5 pages.

* cited by examiner

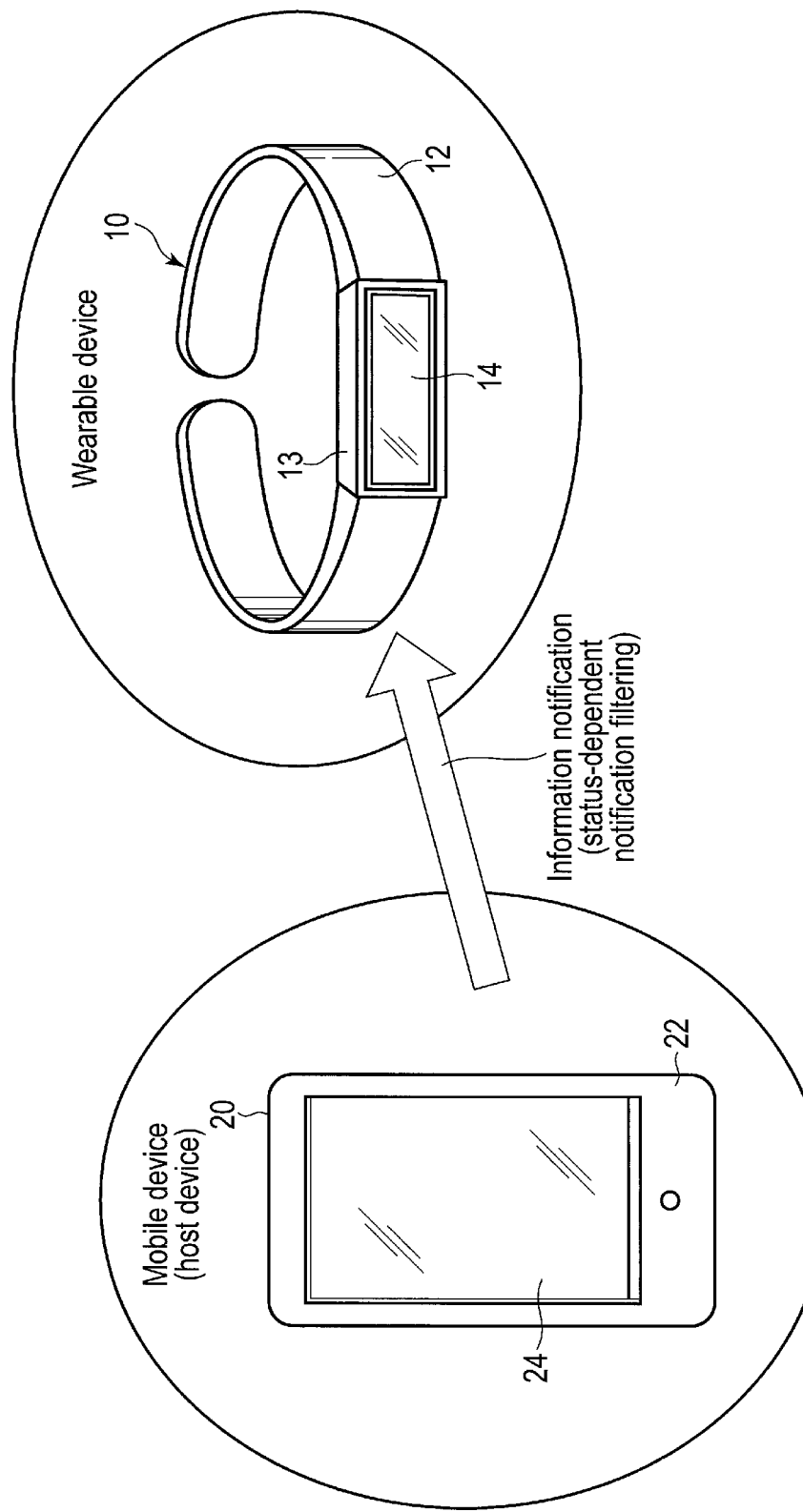
F I G. 1

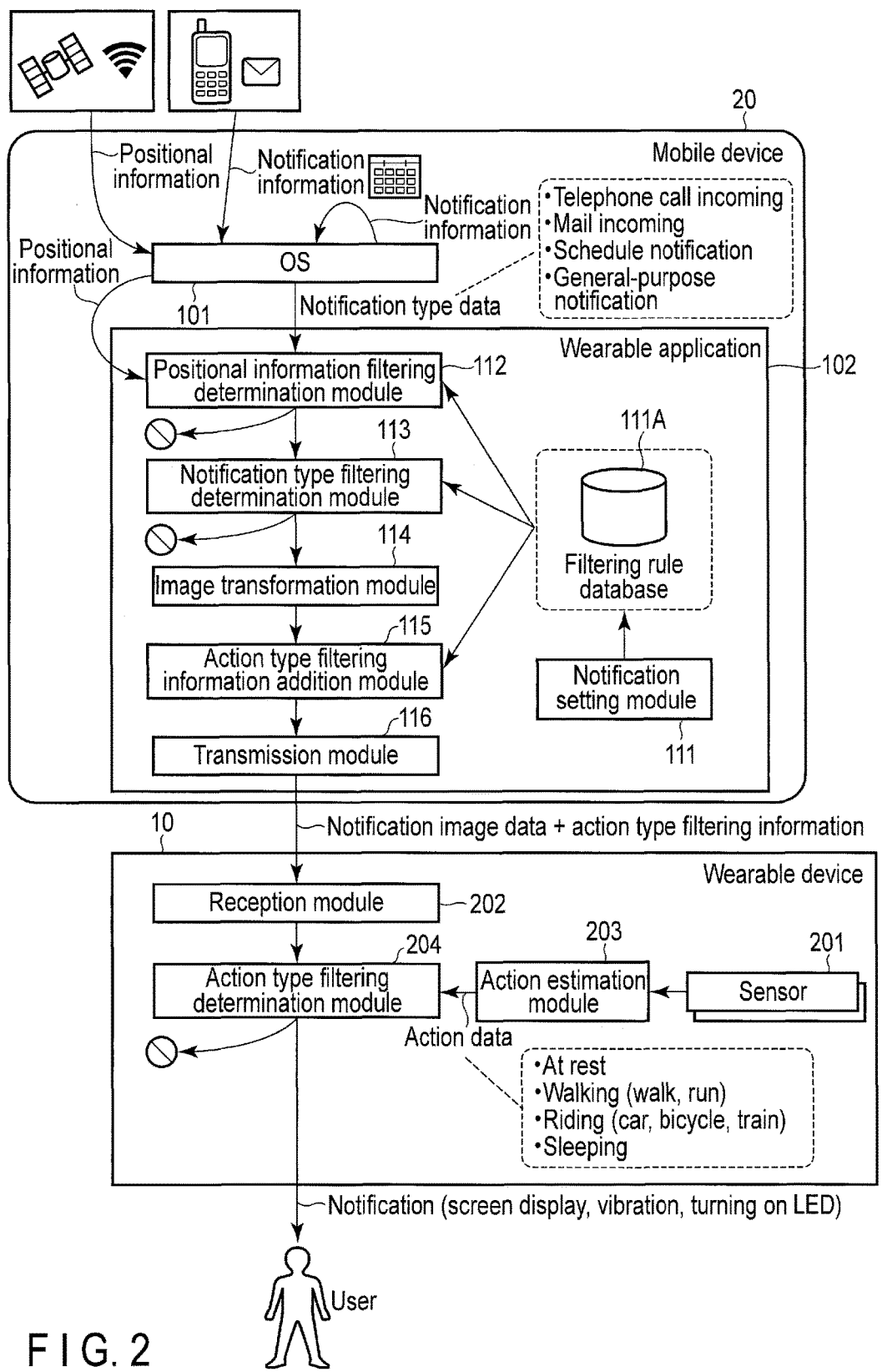
F I G. 2

FIG. 3

| Position = home | | Sender list | Notification rejection keyword | Anonymous permission | Unregistered number permission | Application list | T1 |
|---|---|---|---|---|---|---|---|
| Telephone notification | ON | A,B,C,D,E | | ON | ON | | |
| SMS notification | ON | A,B,C,D,E | Keyword 1 Keyword 2 | ON | ON | | |
| Schedule notification | ON | | | | | | |
| General-purpose notification | ON | | | | | Application A | |

| Position = office (school) | | Sender list | Notification rejection keyword | Anonymous permission | Unregistered number permission | Application list | T2 |
|---|---|---|---|---|---|---|---|
| Telephone notification | ON | A,B | | OFF | OFF | | |
| SMS notification | ON | A,B | Keyword 1 Keyword 2 | OFF | OFF | | |
| Schedule notification | ON | | | | | | |
| General-purpose notification | OFF | | | | | | |

| Action = sleeping | Sender list | Notification rejection keyword | Anonymous permission | Unregistered number permission | Application list |
|---|---|---|---|---|---|
| Telephone notification | ON | A | | OFF | OFF | |
| SMS notification | ON | A | Keyword 1 Keyword 2 | OFF | OFF | |
| Schedule notification | OFF | | | | | |
| General-purpose notification | OFF | | | | | |

T4:

| Action = walking | Sender list | Notification rejection keyword | Anonymous permission | Unregistered number permission | Application list |
|---|---|---|---|---|---|
| Telephone notification | ON | A | | OFF | OFF | |
| SMS notification | ON | A | Keyword 1 Keyword 2 | OFF | OFF | |
| Schedule notification | OFF | | | | | |
| General-purpose notification | OFF | | | | | |

| Action = riding | Sender list | Notification rejection keyword | Anonymous permission | Unregistered number permission | Application list |
|---|---|---|---|---|---|
| Telephone notification | OFF | | | | | |
| SMS notification | OFF | | | | | |
| Schedule notification | OFF | | | | | |
| General-purpose notification | OFF | | | | | |

T5

| Action = at rest | Sender list | Notification rejection keyword | Anonymous permission | Unregistered number permission | Application list |
|---|---|---|---|---|---|
| Telephone notification | ON | A,B,C,D,E | | ON | ON | |
| SMS notification | ON | A,B,C,D,E | Keyword 1 Keyword 2 | ON | ON | |
| Schedule notification | ON | | | | | |
| General-purpose notification | ON | | | | | Application A,B |

T6

F I G. 5

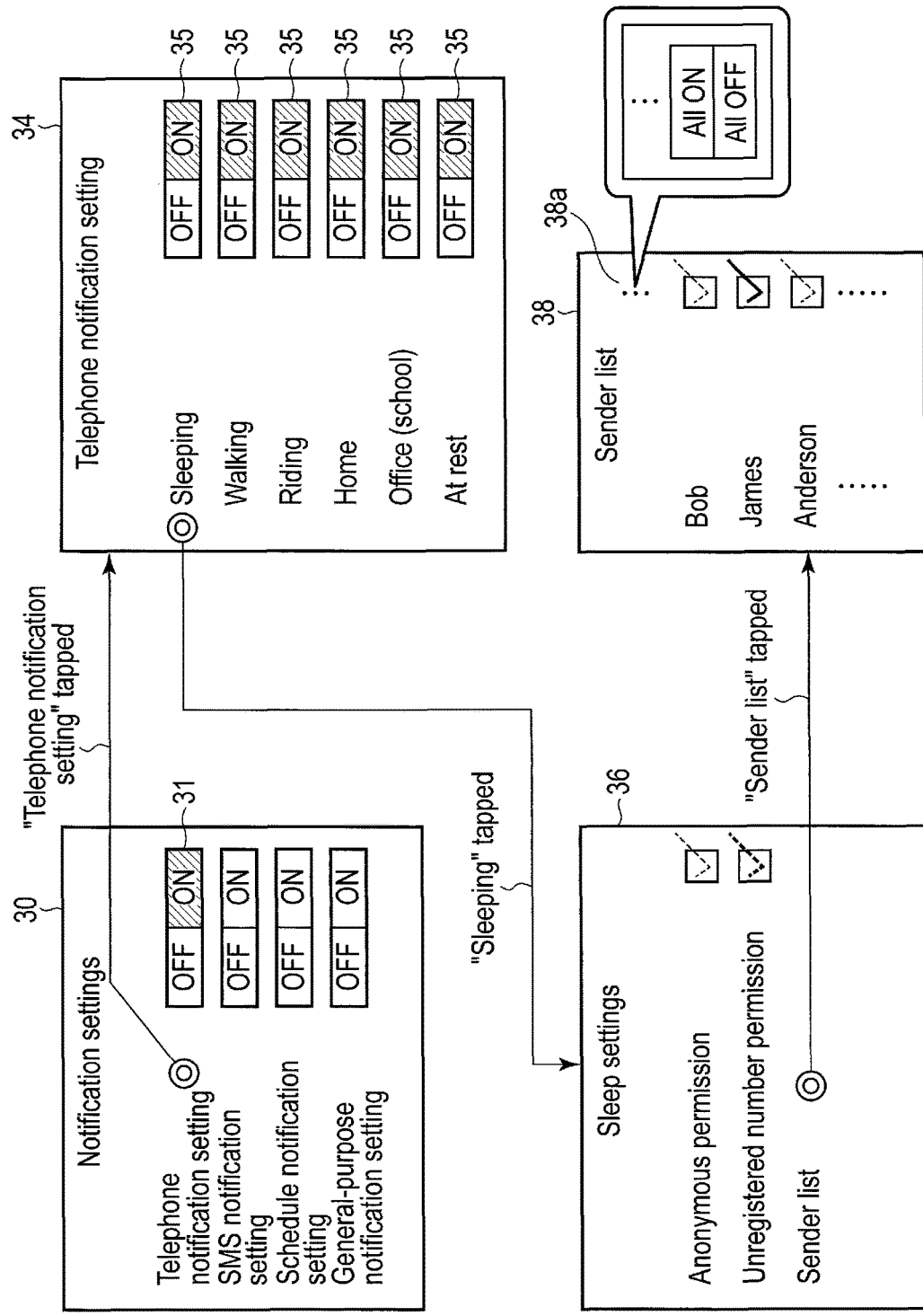
F I G. 8

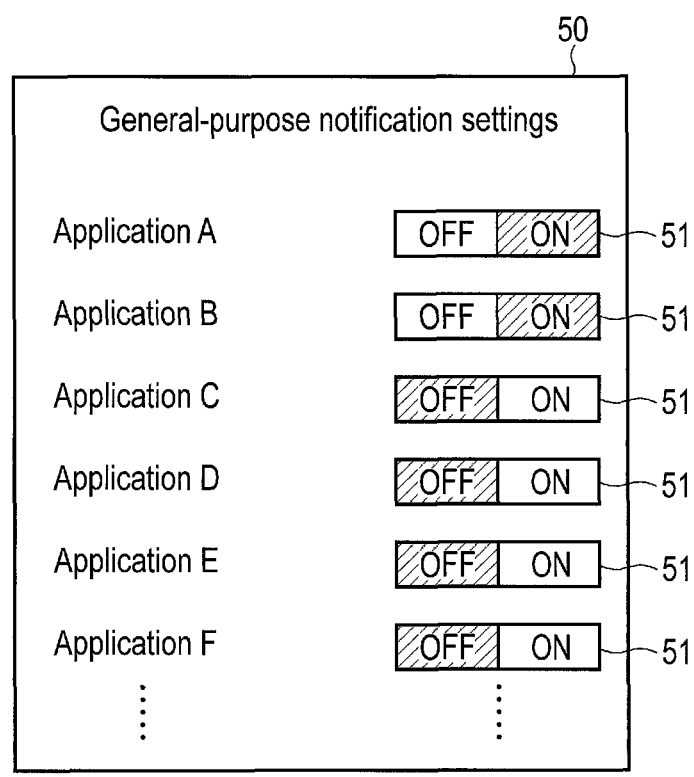
F I G. 10

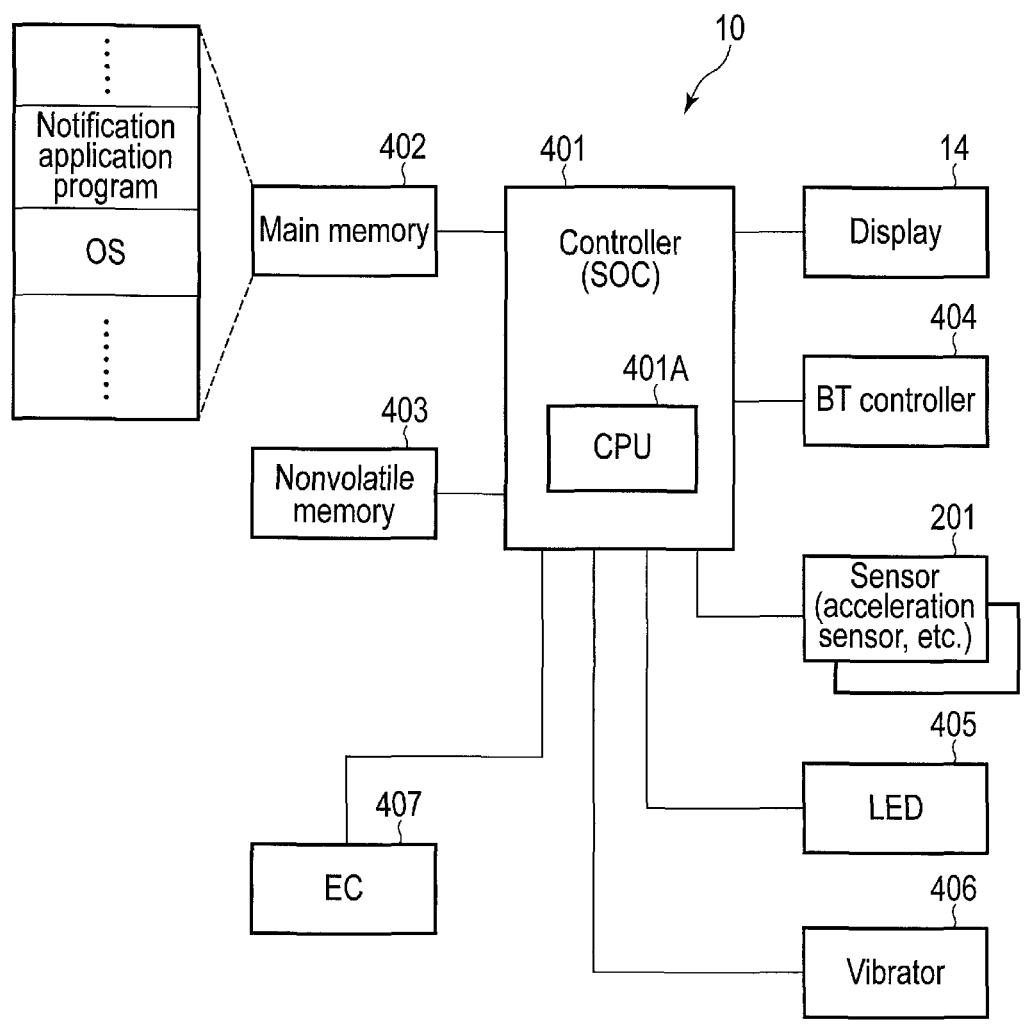
F I G. 12

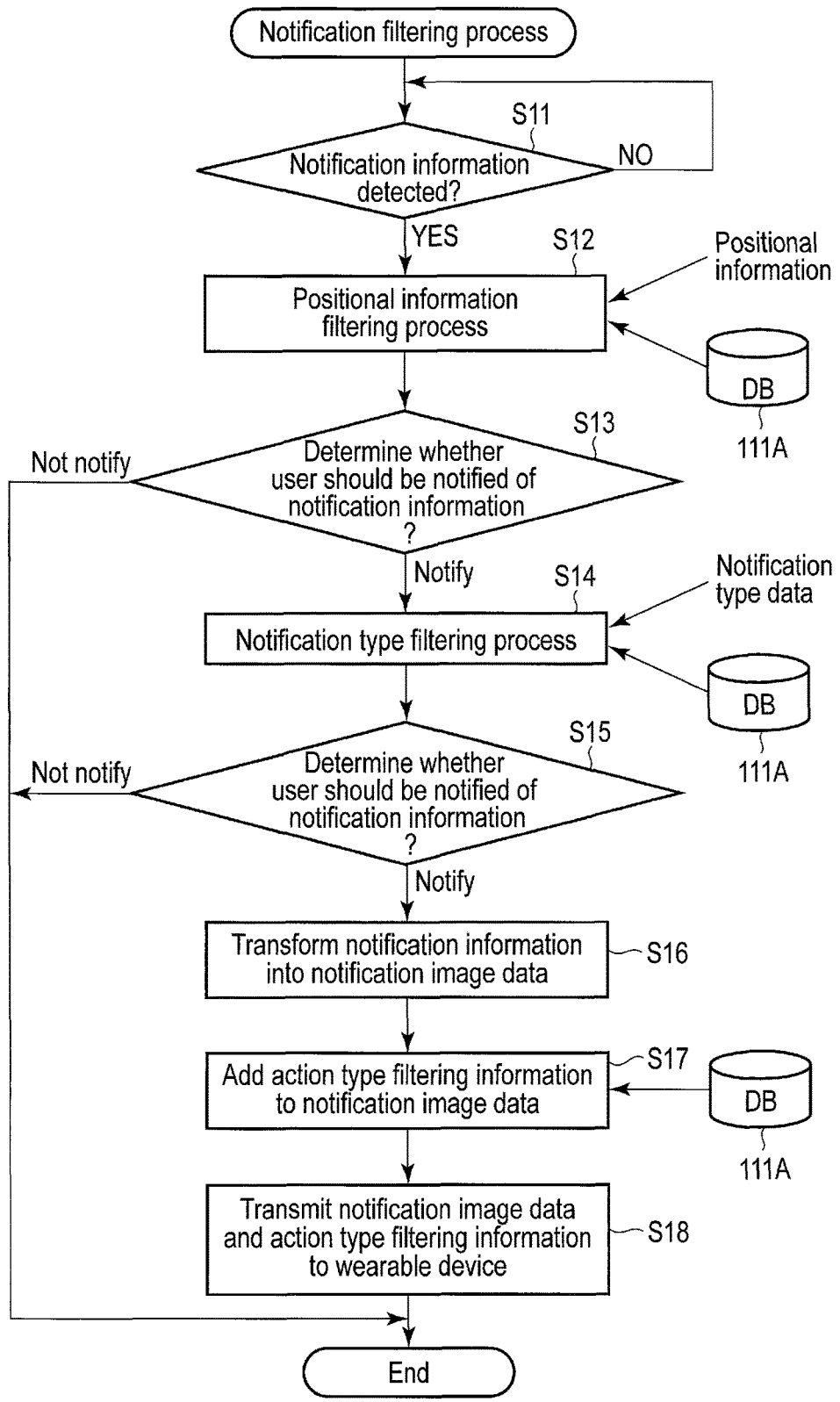
F I G. 13

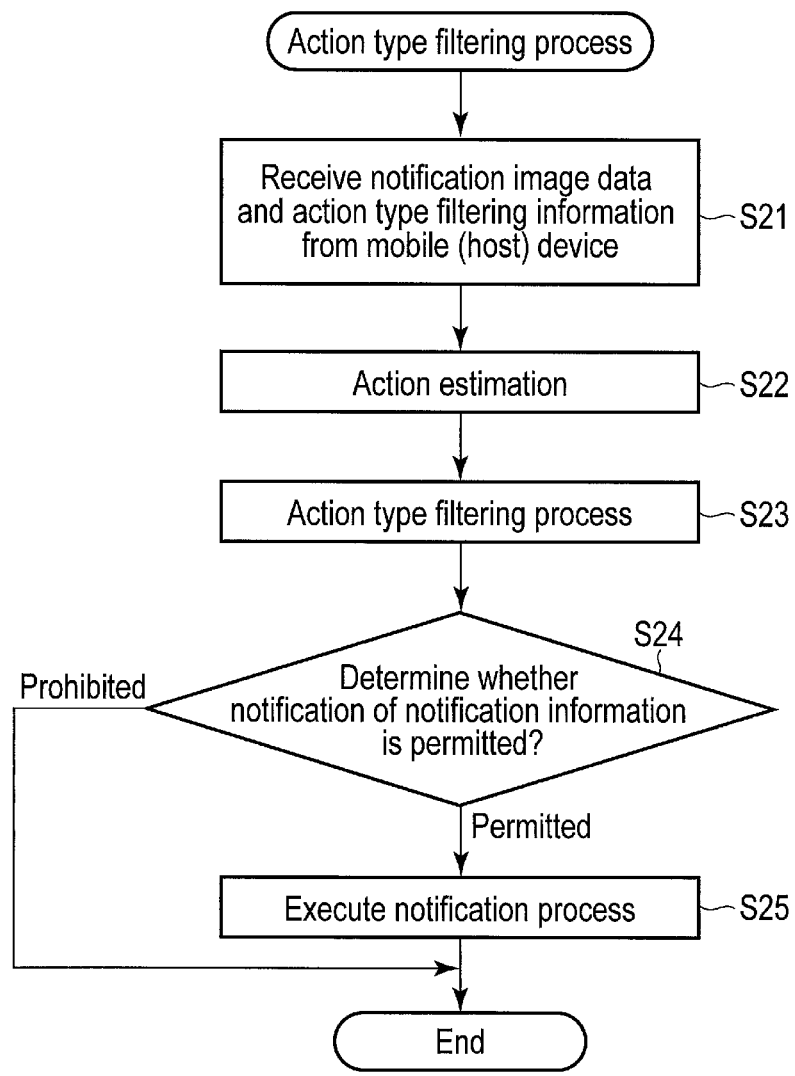
F I G. 14

ELECTRONIC DEVICE AND METHOD FOR FILTERING NOTIFICATION INFORMATION

CROSS REFERENCE TO RELATED APPLICATIONS

This application is a Continuation application of PCT Application No. PCT/JP2014/067418, filed Jun. 30, 2014, the entire contents of which are incorporated herein by reference.

FIELD

Embodiments described herein relate generally to a technique for making a wearable device and an external device cooperate with each other.

BACKGROUND

In recent years, various mobile devices such as a smartphone have been developed. Each mobile device has various functions such as a communication function, position detection function, and the like.

Further, recently, various wearable devices have been developed owing to downsizing of information equipment, and their market is expanding. A wearable device is an electronic device which can be fitted on the body of a user.

Although there are sometimes cases where a mobile device such as a smartphone is put into a bag or a pocket of the user, a wearable device is often worn by the user at all times.

Accordingly, the wearable device is suitable as a device for notifying the user of various information items.

Heretofore, however, notifying the user of information by utilizing cooperation between a wearable device and an external device has not been considered.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view illustrating a relationship between an electronic device according to an embodiment and an external device.

FIG. 2 is an exemplary block diagram illustrating a configuration of the electronic device of the embodiment and a configuration of the external device.

FIG. 3 is an exemplary view illustrating part of a filtering rule used in the embodiment.

FIG. 4 is an exemplary view illustrating another part of the filtering rule.

FIG. 5 is an exemplary view illustrating still another part of the filtering rule.

FIG. 8 is an exemplary view illustrating screen transition in the telephone notification setting processing.

FIG. 10 is an exemplary view illustrating a notification setting screen displayed in the general-purpose notification setting processing.

FIG. 12 is an exemplary block diagram illustrating a hardware configuration of the electronic device of the embodiment.

FIG. 13 is an exemplary flowchart illustrating the procedure of the notification filtering processing executed by the external device.

FIG. 14 is an exemplary flowchart illustrating the procedure of the action type filtering processing executed by the electronic device of the embodiment.

DETAILED DESCRIPTION

Figure 6:
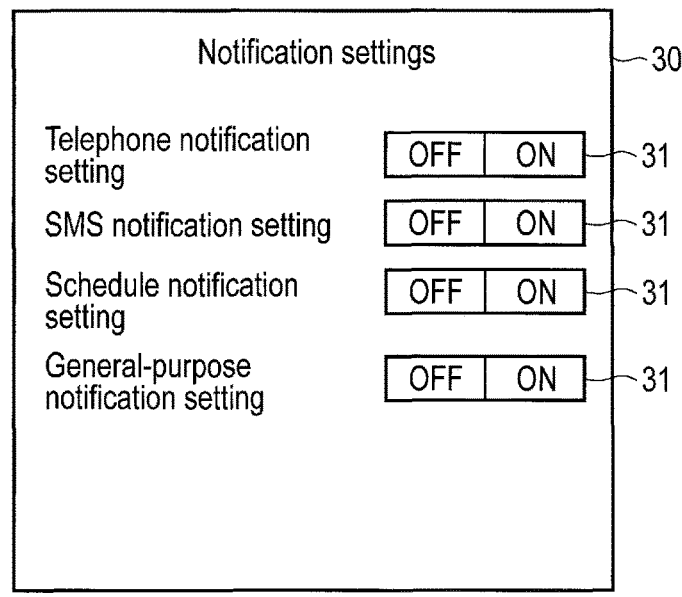
FIG. 6 is an exemplary view illustrating a notification setting screen used in the embodiment.

Various embodiments will be described hereinafter with reference to the accompanying drawings.

In general, according to one embodiment, an electronic device which can be fitted on a body of a user includes a hardware processor and a receiver. The hardware processor is configured to estimate action of the user by using one or more sensors. The receiver is configured to receive first notification information and filtering information from an external device associated with the electronic device. The filtering information is indicative of whether the user should be notified of the first notification information for each action type. The hardware processor is configured to determine whether the estimated action is of an action type for which notification of the first notification information is permitted based on the estimated action and the filtering information, and to execute, when the estimated action is of the action type for which notification of the first notification information is permitted, processing for notifying the user of the first notification information.

FIG. 1 illustrates a relationship between an electronic device according to an embodiment and an external device (host device). This electronic device is realized as a wearable device 10 which can be fitted on the body (for example, an arm, neck, head, and the like) of the user. As the wearable device 10, a bracelet-type wearable device, wristwatch-type wearable device, eyeglass-type wearable device, headphone-type wearable device, and the like can be used. In the following, a case where the wearable device 10 is a bracelet-type wearable device is assumed.

The wearable device 10 includes a belt 12, and a main body 13 attached to the belt 12. In the surface of the main body 13, a display 14 is arranged. The wearable device 10 can wirelessly communicate with an external device (host device) correlated with this wearable device 10. As the external device (host device), an arbitrary device correlated with the wearable device 10 can be used. In the following, a case where the external device is a mobile device 20 is assumed. This mobile device 20 may also be a mobile computer (mobile computing device) such as a smartphone and tablet. The mobile device 20 includes a main body 22, and a display 24 arranged in the top surface of the main body 22. The display 24 may be a touch-screen display.

By cooperating with the mobile device 20 which is an external device correlated with the wearable device 10, the wearable device 10 can notify the user wearing the wearable devices 10 of various information items. The information items of which the user wearing the wearable device 10 to be notified are various notifications (notification information) such as information concerning a telephone call incoming notification, information concerning a mail incoming notification, information concerning a schedule notification, and information concerning a general-purpose notification (notification from each of various application programs).

The wearable device 10 receives information (notification information) concerning a notification detected in the mobile device 20, from the mobile device 20. Then, the wearable device 10 executes the processing for notifying the user wearing the wearable device 10 of the received notification information. In the processing for notifying the user of the notification information, at least one of processing of displaying the notification information on the display 14, processing of turning on a light emitting device (LED) provided in the wearable device 10, and processing of vibrating the main body 13 of the wearable device 10 may be executed.

In this embodiment, status-dependent notification filtering configured to control (limit) the type of notification information of which the user should be notified according to the current status (position, action) of the user is executed. In the status-dependent notification filtering, notification information of which the user should be notified through the wearable device 10 is automatically controlled (limited) based on a predefined filtering condition. The filtering condition is defined based on the current status (position, action) of the user or based on both the current status (position, action) of the user and the type of the notification information (telephone call incoming notification, mail (message) incoming notification, schedule notification, general-purpose notification, and the like).

For example, at home, all the notifications may be permitted. Further, in the office (school), all the notifications may be prohibited or only particular notifications may be permitted.

While the user is riding (automobile, bicycle, train), all the notifications may be prohibited. Alternatively, while the user is riding (automobile, bicycle, train), only specific notifications may be permitted.

While the user is sleeping or is walking, all the notifications may be prohibited or only particular notifications may be permitted. While the user is at rest, all the notifications may be permitted.

The filtering condition may be made so that it can arbitrarily be set or changed by the user.

The status-dependent notification filtering using position may be executed by the mobile device 20 by using positional information indicative of the current position of the mobile device 20 (current position of the user carrying the mobile device 20). When a notification (notification information) such as a telephone call incoming notification, mail (message) incoming notification, schedule (calendar) notification, and general-purpose notification is detected in the mobile device 20, the mobile device 20 may determine whether the notification information should be transmitted to the wearable device 10 based on the filtering condition and the positional information. When the current position of the mobile device 20 is the position (registered position) for which notification of the detected notification information is permitted, the detected notification information is transmitted from the mobile device 20 to the wearable device 10. On the other hand, when the current position of the mobile device 20 is another position (another registered position) for which notification of the detected notification information is prohibited, the detected notification information is not transmitted to the wearable device 10.

The status-dependent notification filtering (notification filtering processing) using position can also be executed in the wearable device 10. In this case, however, it becomes necessary that all the notification information items should be transmitted from the mobile device 20 to the wearable device 10 irrespectively of the current position. Accordingly, there is a possibility of an increase in traffic volume being caused.

In this embodiment, the status-dependent notification filtering (notification filtering processing) using position is executed in the mobile device 20. Accordingly, it is possible to prevent useless notification information (notification information of which the user is not notified finally) from being transmitted from the mobile device 20 to the wearable device 10.

The wearable device 10 can estimate the action of the user by using one or more sensors in the wearable device 10. The types of the action of the user are, for example, at rest, walking, riding (moving in a means of transportation), sleeping, and the like.

The status-dependent notification filtering using action may also be executed by the wearable device 10 by using an estimation result of the action of the user. The mobile device 20 transmits the notification information which has passed through the status-dependent notification filtering using position, and filtering information (action type filtering information) corresponding to the notification information to the wearable device 10. The action type filtering information is filtering information indicative of an action type for which notification of the notification information should be permitted or prohibited. This action type filtering information is generated by the mobile device 20 based on the aforementioned filtering condition.

For example, the action type filtering information may be a list (white list) of one or more action types for which notification of this notification information should be permitted. Alternatively, the action type filtering information may be a list (black list) of one or more action types for which notification of this notification information should be prohibited. Still alternatively, this action type filtering information may include both the white list and the black list.

The wearable device 10 receives the notification information and action type filtering information corresponding to this notification information from the wearable device 10. Then, the wearable device 10 determines whether the estimated current action of the user is of the action type for which notification of this notification information is permitted based on the estimated current action of the user and action type filtering information. When the estimated current action of the user is of the action type for which notification of this notification information is permitted, the wearable device 10 executes the processing for notifying the user of this notification information. On the other hand, when the estimated current action of the user is of the action type for which notification of this notification information is prohibited, the wearable device 10 does not notify the user of this notification information.

As described above, in this embodiment, the status-dependent notification filtering using action (action type filtering processing) is executed by the wearable device 10 having the function of estimating the action of the user. Accordingly, it is not necessary that information indicative of an estimation result of the action should be transmitted from the wearable device 10 to the mobile device 20.

It is also possible to use a method in which the action type filtering processing is executed in the mobile device 20. In this case, however, it becomes necessary that the current action estimation result of the user should be transmitted from the wearable device 10 to the mobile device. As a result, the time necessary for the action type filtering processing is increased by the length of time necessary for transmission of the action estimation result, and consequently there is a possibility of a delay in notification being caused.

In this embodiment, the action type filtering processing is executed in the wearable device 10, and hence it is possible to realize quick notification.

It should be noted that it is also possible to control (limit) the type of notification information of which the user should be notified according to only the current action of the user without using the current position of the user.

FIG. 2 illustrates a configuration of the wearable device 10 and a configuration of the mobile device 20.

In the mobile device 20, instructions included in an operating system (OS) 101 and instructions included in a wearable application program 102 are executed by, for example, a hardware processor provided in the mobile device 20. By using the instructions included in the operating system (OS) 101, various notification information items (telephone call incoming notification, mail (message) incoming notification, schedule notification, general-purpose notification, and the like) can be detected, and the detected notification information can be displayed on the screen of the display 24 of the mobile device 20.

In the status-dependent notification filtering, displaying the notification information on the screen of the mobile device 20 is not limited, and notifying the user of the notification information through the wearable device 10 is limited. The wearable application program 102 includes instructions for cooperating with the wearable device 10. By using the instructions in the wearable application program 102, notification information detected in the mobile device 20 can be acquired from the OS 101. Further, by using the instructions in the wearable application program 102, positional information indicating the current position of the mobile device 20 can be acquired from the OS 101. Furthermore, by using the instructions in the wearable application program 102, from the notification information, notification type data (telephone call incoming notification, mail (message) incoming notification, schedule notification, and general-purpose notification) of the notification information can be acquired.

The wearable application program 102 includes a notification setting module 111, a positional information filtering determination module 112, a notification type filtering determination module 113, an image transformation module 114, an action type filtering information addition module 115, and a transmission module 116.

The notification setting module 111 includes instructions for performing notification setting processing for defining a filtering condition according to an operation of the user. The filtering condition is a condition for limiting the type of notification information of which the user should be notified through the wearable device 10. More specifically, the filtering condition defines whether notification of each notification information item should be permitted for each position type of the mobile device 20 (position type of the user), and defines whether notification of each notification information item should be permitted for each action type of the user. Information indicative of the defined filtering condition is stored in a filtering rule database 111A.

The positional information filtering determination module 112 includes instructions for determining whether the detected notification information should be transmitted to the wearable device 10 based on the filtering condition stored in the filtering rule database 111A and the positional information. For example, the positional information filtering determination module 112 includes instructions for discarding this notification information if the current position of the mobile device 20 is the position (registered position) for which notification (notification through the wearable device 10) of all the types of notification information items should be prohibited. On the other hand, the positional information filtering determination module 112 includes instructions for supplying this notification information to the notification type filtering determination module 113 if the current position of the mobile device 20 is of the position type for which notification (notification through the wearable device 10) of all or specific types of notification information items are permitted.

Furthermore, the positional information filtering determination module 112 also includes instructions for supplying the detected notification information to the notification type filtering determination module 113 when the current position of the mobile device 20 differs from all the positions registered in the filtering condition.

As described above, in this embodiment, the filtering processing using positional information is executed first. Thereby, in the status-dependent notification filtering, the filtering condition concerning the current position can be applied by priority to the filtering condition concerning the action type. For example, a case where a filtering condition that notification of all the types of notification information items is prohibited at a position of "office" is defined is assumed. In this case, when the current position is a registered position corresponding to "office", transmission of notification information to the wearable device 10 is prohibited irrespectively of the current action type of the user such as "at rest", "sleeping" and the like.

Further, at the position of "office", it is also possible to permit only specific types of notification information items to be transmitted to the wearable device 10 and prohibit the other types of notification information items from being transmitted to the wearable device 10 by a cooperative operation using the instructions in the positional information filtering determination module 112 and instructions in the notification type filtering determination module 113 to be described later.

Information necessary for the user largely differs according to the position (place) at which the user is. Accordingly, by preferentially executing filtering processing using positional information, it is possible to notify the user of the type of notification information suitable for the current position of the user.

Further, the filtering processing using positional information is processing which can be completed inside the mobile device 20, and can be executed without communication with the wearable device 10. Accordingly, the configuration of this embodiment in which the filtering processing using positional information is preferentially executed makes it possible to efficiently execute the status-dependent notification filtering.

The notification type filtering determination module 113 includes instructions for determining whether this notification information should be transmitted to the wearable device 10 based on the filtering condition and the notification type corresponding to the notification information. The notification type filtering determination module 113 includes instructions for discarding this notification information if this notification type is a notification type for which notification (notification through the wearable device 10) should be prohibited irrespectively of the action type. On the other hand, the notification type filtering determination module 113 includes instructions for supplying this notification information to the image transformation module 114 if this notification type is not a notification type for which notification (notification through the wearable device 10) is prohibited irrespectively of the action type.

The image transformation module 114 may include instructions for transforming the notification information received from the notification type filtering determination module 113 into notification image data (screen image data) having a format which can be displayed by the wearable device 10. The notification image data is image data representing at least part of the contents of the notification information. For example, in the case of telephone call incoming, notification image data capable of presenting the name of the sender (caller), and telephone number of the sender (caller) to the user may be generated.

As described above, in this embodiment, not the notification information itself, but the notification image data can be transmitted to the wearable device 10. Thereby, it becomes unnecessary for the wearable device 10 to retain font data and the like, and thus it is possible to simplify the configuration of the wearable device 10. Of course, the notification information itself may also be transmitted to the wearable device 10.

The action type filtering information addition module 115 includes instructions for adding action type filtering information to the notification information (notification image data) to be transmitted to the wearable device 10. The action type filtering information indicates permission for or prohibition of notification of this notification information for each action type of the user. For example, the action type filtering information addition module 115 includes instructions for creating action type filtering information corresponding to certain notification information (first notification information) based on the filtering condition in the case where notification image data corresponding to the first notification information should be transmitted to the wearable device 10. This action type filtering information includes at least one of first information (white list) indicative of one or more action types for which notification of the first notification information should be permitted, and second information (black list) indicative of one or more action types for which notification of the first notification information should be prohibited.

The transmission module 116 includes instructions for transmitting the notification information (notification image data) to which the action type filtering information is added to the wearable device 10. The action type filtering information is filtering information concerning only one notification information item which is the current transmission target, and hence the information volume thereof is small. Accordingly, even when the notification information to which the action type filtering information is added is transmitted to the wearable device 10, an increase in data traffic volume is hardly caused.

The wearable device 10 includes one or more sensors 201, a reception module 202, an action estimation module 203, and an action type filtering determination module 204. The one or more sensors 201 may include, for example, an acceleration sensor. Alternatively, the one or more sensors 201 may include an acceleration sensor and a gyro sensor. Still alternatively, the one or more sensors 201 may include an acceleration sensor and a pulse wave sensor.

The reception module 202 receives the notification information (notification image data) to which the action type filtering information is added from the mobile device 20. The action estimation module 203 and the action type filtering determination module 204 are realized by a controller, a processor or the like in the wearable device 10. The action estimation module 203 estimates the action of the user by using the one or more sensors 201. In this case, the action estimation module 203 may estimate which one of "at rest", "walking", "riding", and "sleeping" is the current action of the user. Which one of "at rest", "walking", "riding", and "sleeping" is the current action of the user may be estimated according to a pattern or the like of a change in the detected acceleration. Regarding estimation whether the current action of the user is "sleeping", the posture of the user may be estimated by using, for example, an acceleration sensor. The current action of the user may be estimated to be "sleeping" on condition that the estimated posture of the user is a specific posture and the specific posture continues for a period of time equal to or longer than a threshold time. Alternatively, it may be estimated whether the current action of the user is "sleeping" based on a detected value of the pulse wave sensor.

The action type filtering determination module 204 determines whether the estimated action of the user is of an action type for which notification of the received notification information is permitted based on the action type filtering information added to the notification information and the estimated action.

If the estimated action of the user is of the action type for which notification of the received notification information should be prohibited, the action type filtering determination module 204 does not carry out notification (for example, display of the notification information on the screen) of the received notification information. In this case, the action type filtering determination module 204 may discard the received notification information. Alternatively, the action type filtering determination module 204 may accumulate the received notification information in the internal memory without carrying out display of the notification information on the screen. In this case, the action type filtering determination module 204 may notify the user that the notification information is accumulated in the internal memory by turning on the LED, and the like. When an operation button of the wearable device 10 is operated by the user or when the estimated action of the user has changed into the action of an action type for which notification of the received notification information is permitted, notification (for example, display of the notification information on the screen) of the notification information accumulated in the internal memory may be carried out.

Next, an example of the filtering condition (filtering rule) will be described below with reference to FIGS. 3 to 5.

Information indicative of the filtering condition can be expressed in various data structures. The data structure to be explained in connection with FIGS. 3 to 5 is one example, and other various data structures can be used.

Table T1 of FIG. 3 illustrates an example of a filtering condition corresponding to "home". In Table T1, the notification filtering function is set to ON with respect to all the notification types including telephone notification, SMS (short message service) notification, schedule notification, and general-purpose notification. The data structure may also be made in such a manner that details (detailed conditions) of notification contents for which notification to the user should be permitted or prohibited can be defined when the notification filtering function is set to ON. In this case, setting the notification filtering function to ON implies that the mode is a mode in which the user is to be notified of only notification information whose notification is permitted according to the detailed conditions (i.e., notification conditions). Setting the notification filtering function to OFF implies a mode in which the user is not to be notified of all the notification information items of the corresponding types. Filtering using the detailed conditions may also be executed by using, for example, the instructions included in the notification type filtering determination module 113.

Regarding telephone notification and SMS notification, an item of a "sender list" used to specify a sender for whom notification of notification information should be permitted may be provided. In Table T1, a sender A, sender B, sender C, sender D, and sender E are set in each of the "sender list" corresponding to telephone notification, and the "sender list" corresponding to SMS notification. For example, when notification information of telephone call incoming from the sender (caller) A is detected, notification of this notification information is permitted since the sender A is registered in the "sender list" of telephone notification.

Regarding SMS notification, an item of "notification rejection keyword" used to specify the contents of a message for which notification of the notification information should be prohibited may be provided. In Table T1, a keyword 1 and keyword 2 are set as "notification rejection keyword". For example, when SMS notification information concerning message incoming is detected, it is determined whether the keyword 1 or the keyword 2 is included in the subject or the like of this message. If the subject or the like of this message includes the keyword 1 or the keyword 2, notification of the SMS notification information corresponding to this message is prohibited.

Regarding telephone notification and SMS notification, an item of "anonymous permission" used to specify whether notification of notification information concerning incoming of a call or the like (telephone call incoming, message incoming) from an anonymous telephone number should be permitted may be provided. In Table T1, the item of "anonymous permission" of telephone notification is set to ON. In this case, notification of notification information concerning telephone call incoming from an anonymous telephone number is permitted. The item of "anonymous permission" of SMS notification is also set to ON. In this case, notification of notification information concerning SMS incoming from an anonymous telephone number is also permitted.

Regarding telephone notification and SMS notification, an item of "unregistered number permission" used to specify whether notification of notification information concerning incoming of a call or the like (telephone call incoming, message incoming) from an unregistered telephone number not registered in the telephone directory in the mobile device 20 should be permitted may be provided. In Table T1, the item of "unregistered number permission" of telephone notification is set to ON. In this case, notification of notification information concerning telephone call incoming from an unregistered telephone number is permitted. The item of "unregistered number permission" of SMS notification is also set to ON. In this case, notification of notification information concerning SMS incoming from an unregistered telephone number is also permitted.

Regarding schedule notification, none of detailed conditions is used. Accordingly, when the notification filtering function of schedule notification is set to ON, notification of all the notification information items concerning schedule notification is permitted.

Regarding general-purpose notification, an item of "application list" used to specify an application program for which notification of notification information should be permitted may be provided. In Table T1, an application A is set in the "application list". Accordingly, when notification information from the application A is detected, notification of this notification information is permitted.

Table T2 of FIG. 3 illustrates an example of the filtering condition corresponding to "office (school)". In Table T2, the notification filtering function is set to ON with respect to notification types of telephone notification, SMS notification and schedule notification. Further, the notification filtering function of general-purpose notification is set to OFF. Accordingly, notification of all of notification information items concerning general-purpose notification is prohibited.

In Table T2, a sender A and sender B are set in each of a "sender list" of telephone notification and a "sender list" of SMS notification. Furthermore, the item of "anonymous permission" of telephone notification, and the item of "anonymous permission" of SMS notification are respectively set to OFF. Still furthermore, the item of "unregistered number permission" of telephone notification, and the item of "unregistered number permission" of SMS notification are respectively set to OFF.

Accordingly, at "office (school)", only notification of notification information concerning call incoming from the sender A or the sender B is permitted with respect to telephone call incoming and message incoming.

Table T3 of FIG. 4 illustrates an example of the filtering condition corresponding to "sleeping". In Table T3, the notification filtering function is set to ON with respect to the notification types of telephone notification and SMS notification. Further, the notification filtering function is set to OFF with respect to the notification types of schedule notification and general-purpose notification. Accordingly, notification of all of notification information items concerning schedule notification, and notification of all of notification information items concerning general-purpose notification are prohibited.

In Table T3, a sender A is set in each of a "sender list" of telephone notification and a "sender list" of SMS notification. Furthermore, the item of "anonymous permission" of telephone notification, and the item of "anonymous permission" of SMS notification are respectively set to OFF. Still furthermore, the item of "unregistered number permission" of telephone notification, and the item of "unregistered number permission" of SMS notification are respectively set to OFF.

Accordingly, while "sleeping", only notification of notification information concerning call incoming from the sender A is permitted with respect to telephone call incoming or message incoming.

Table T4 of FIG. 4 illustrates an example of the filtering condition corresponding to "walking". The action type "walking" relates to the action corresponding to movement of the user not utilizing a means of transportation. The action type "walking" may include not only the action corresponding to walking, but also the action corresponding to running.

In Table T4, the notification filtering function is set to ON with respect to the notification types of telephone notification and SMS notification. Further, the notification filtering function is set to OFF with respect to the notification types of schedule notification and general-purpose notification. Accordingly, notification of all of notification information items concerning schedule notification, and notification of all of notification information items concerning general-purpose notification are prohibited.

In Table T4, a sender A is set in each of a "sender list" of telephone notification and a "sender list" of SMS notification. Furthermore, an item of "anonymous permission" of telephone notification, and an item of "anonymous permission" of SMS notification are respectively set to OFF. Still furthermore, an item of "unregistered number permission"

of telephone notification, and an item of "unregistered number permission" of SMS notification are respectively set to OFF.

Accordingly, while "walking", only notification of notification information concerning call incoming from the sender A is permitted with respect to telephone call incoming or message incoming.

Table T5 of FIG. 5 illustrates an example of the filtering condition corresponding to "riding". The "riding" implies the action corresponding to movement of the user utilizing a means of transportation.

In Table T5, the notification filtering function is set to OFF with respect to all of notification types including telephone notification, SMS notification, schedule notification, and general-purpose notification. Accordingly, while "riding", notification of all the notification information items concerning all the notification types is prohibited.

Table T6 of FIG. 5 illustrates an example of the filtering condition corresponding to "at rest".

In Table T6, the notification filtering function is set to ON with respect to all of notification types of telephone notification, SMS notification, schedule notification, and general-purpose notification.

Further, in Table T6, a sender A, sender B, sender C, sender D, and sender E are set in each of a "sender list" of telephone notification and a "sender list" of SMS notification. Furthermore, an item of "anonymous permission" of telephone notification, and an item of "anonymous permission" of SMS notification are respectively set to ON. Still furthermore, an item of "unregistered number permission" of telephone notification, and an item of "unregistered number permission" of SMS notification are respectively set to ON.

Regarding general-purpose notification, an application A and an application B are set in an "application list".

Now, a case where the current position of the mobile device 20 is the "office", and notification information concerning general-purpose notification is detected is assumed. At the "office", the notification filtering function of general-purpose notification is set to OFF. Accordingly, this notification information is discarded by using the instructions in the positional information filtering determination module 112 of the mobile device 20.

Next, a case where the current position of the mobile device 20 is the "office", and notification information concerning telephone call incoming from the user B is detected is assumed. At the "office", the notification filtering function of telephone notification is set to ON, and the "sender list" includes the user B. Accordingly, it is determined that this notification information should be transmitted to the wearable device 10 by using the instructions in the positional information filtering determination module 112 and the instructions in the notification type filtering determination module 113 of the mobile device 20. Regarding the notification filtering function of telephone notification, the action type "sleeping" is set to ON, "walking" is set to ON, "riding" is set to OFF, and "at rest" is set to ON. Of the action types "sleeping", "walking" and "at rest" for which the notification filtering function is set to ON, the action type in which the user B is set in the "sender list" is only "at rest".

Accordingly, by using the instructions in the action type filtering information addition module 115, action type filtering information indicative of the expressions of "sleeping"=notification prohibited, "walking"=notification prohibited, "riding"=notification prohibited, and "at rest"=notification permitted is created. Alternatively, by using the instructions in the action type filtering information addition module 115, a white list including "at rest" or a black list including "sleeping", "walking" and "riding" may be created as the action type filtering information.

Then, the notification information to which this action type filtering information is added is transmitted to the wearable device 10.

Upon receipt of the notification information to which the action type filtering information is added, the wearable device 10 estimates which one of "sleeping", "walking", "riding", and "at rest" is the current action of the user. When the current action of the user is "at rest", the wearable device 10 executes the processing for notifying the user of the received notification information. On the other hand, when the current action of the user is one of "sleeping", "walking" and "riding", the wearable device 10 does not execute the processing for notifying the user of the received notification information.

As described above, in this embodiment, control configured to notify the user of only information about incoming from a specific person in a specific status is enabled.

Next, a case where the current position of the mobile device 20 is the "office", and notification information concerning schedule notification is detected is assumed. At the "office", the notification filtering function of schedule notification is set to ON. Accordingly, it is determined that this notification information should be transmitted to the wearable device 10 by using the instructions in the positional information filtering determination module 112 and the instructions in the notification type filtering determination module 113 of the mobile device 20. Regarding the notification filtering function of schedule notification, "sleeping" is set to OFF, "walking" is set to OFF, "riding" is set to OFF, and "at rest" is set to ON.

Accordingly, action type filtering information indicating the expressions of "sleeping"=notification prohibited, "walking"=notification prohibited, "riding"=notification prohibited, and "at rest"=notification permitted is created by using the instructions in the action type filtering information addition module 115. Then, the notification information to which this action type filtering information is added is transmitted to the wearable device 10.

Upon receipt of the notification information to which the action type filtering information is added, the wearable device 10 estimates which one of "sleeping", "walking", "riding", and "at rest" is the current action of the user. When the current action of the user is "at rest", the wearable device 10 executes the processing for notifying the user of the received notification information. On the other hand, when the current action of the user is one of "sleeping", "walking" and "riding", the wearable device 10 does not execute the processing for notifying the user of the received notification information.

Next, with reference to FIGS. 6 to 10, a user interface concerning the notification setting processing to define the filtering condition will be described below. In this embodiment, the notification setting processing is executed in the mobile device 20.

FIG. 6 illustrates a notification setting screen 30 to be displayed on the display 24 of the mobile device 20. The notification setting screen 30 is a screen serving as an entrance for various notification settings. The notification setting screen 30 displays thereon notification setting items of "telephone notification setting", "SMS notification setting", "schedule notification setting", and "general-purpose notification setting". Furthermore, the notification setting screen 30 displays thereon, for each of the notification setting items, a button switch 31 configured to specify ON or OFF. By operating the button switch 31, the user can specify OFF (notification prohibited) or ON (executing notification filtering using the filtering condition) for each of the notification setting items.

Figure 7:
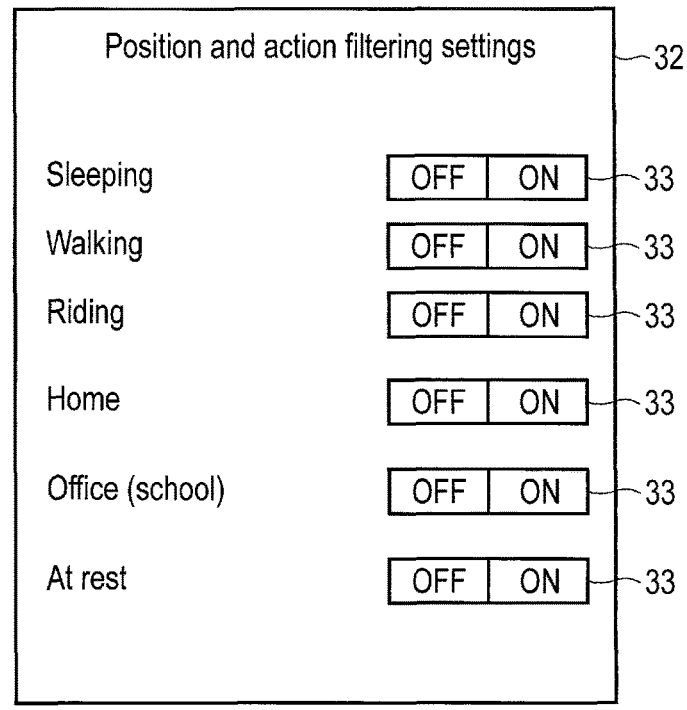
FIG. 7 is an exemplary view illustrating a position and action filtering setting screen used in the embodiment.

FIG. 7 illustrates a position and action filtering setting screen 32 to be displayed on the display 24 of the mobile device 20. The positions and action filtering setting screen 32 is a screen used to set the filtering condition for filtering notification information corresponding to the notification setting item of the setting target by using position and action. The position and action filtering setting screen 32 displays thereon status items of "sleeping", "walking", "riding", "home", "office (school)", and "at rest". Furthermore, the position and action filtering setting screen 32 displays thereon, for each of the status items, a button switch 33 configured to specify ON or OFF. By operating the button switch 33, the user can specify OFF (notification prohibited) or ON (executing notification filtering using the filtering condition) for each of the status items.

FIG. 8 illustrates screen transition in the "telephone notification setting" processing.

When a notification setting item "telephone notification setting" on the notification setting screen 30 is tapped by the user, a telephone notification setting screen 34 is displayed on the display 24 of the mobile device 20. The telephone notification setting screen 34 is a screen for setting the filtering condition concerning position and action for "telephone notification setting" (telephone notification). The telephone notification setting screen 34 displays thereon the status items of "sleeping", "walking", "riding", "home", "office (school)", and "at rest". Furthermore, the telephone notification setting screen 34 displays thereon, for each of the status items, a button switch 35 configured to specify ON or OFF.

For example, when the status item "sleeping" is tapped by the user, a sleeping setting screen 36 for setting detailed conditions (notification conditions) while "sleeping" is displayed on the display 24 of the mobile device 20. The sleeping setting screen 36 displays thereon a setting item of "anonymous permission" used to set whether the user should be notified of call incoming from an anonymous telephone number, a setting item of "unregistered number permission" used to set whether the user should be notified of call incoming from an unregistered telephone number, and a setting item of "sender list". Furthermore, the sleeping setting screen 36 displays thereon a checkbox used to specify enable/disable of "anonymous permission", and a checkbox used to specify enable/disable of "unregistered number permission". By tapping these checkboxes, the user can specify enable/disable for each of "anonymous permission" and "unregistered number permission". When the checkbox corresponding to "anonymous permission" is checked, notification of call incoming from an anonymous telephone number is permitted. When the checkbox corresponding to "unregistered number permission" is checked, notification of call incoming from an unregistered telephone number is permitted.

When the setting item of "sender list" is tapped by the user, a sender list setting screen 38 is displayed. The sender list setting screen 38 displays thereon a list of personal names registered in the telephone directory in the mobile device 20. Furthermore, the sender list setting screen 38 displays thereon a checkbox for each of the persons. Personal names corresponding to the checkboxes checked by the user are registered in the aforementioned sender list.

When an options menu 38a on the sender list setting screen 38 is operated by the user, an "all ON" button and an "all OFF" button are displayed. When the "all ON" button is tapped by the user, all the checkboxes corresponding to all the persons on the sender list setting screen 38 are checked. When the "all OFF" button is tapped by the user, all the checkboxes corresponding to all the persons on the sender list setting screen 38 are unchecked.

Figure 9:
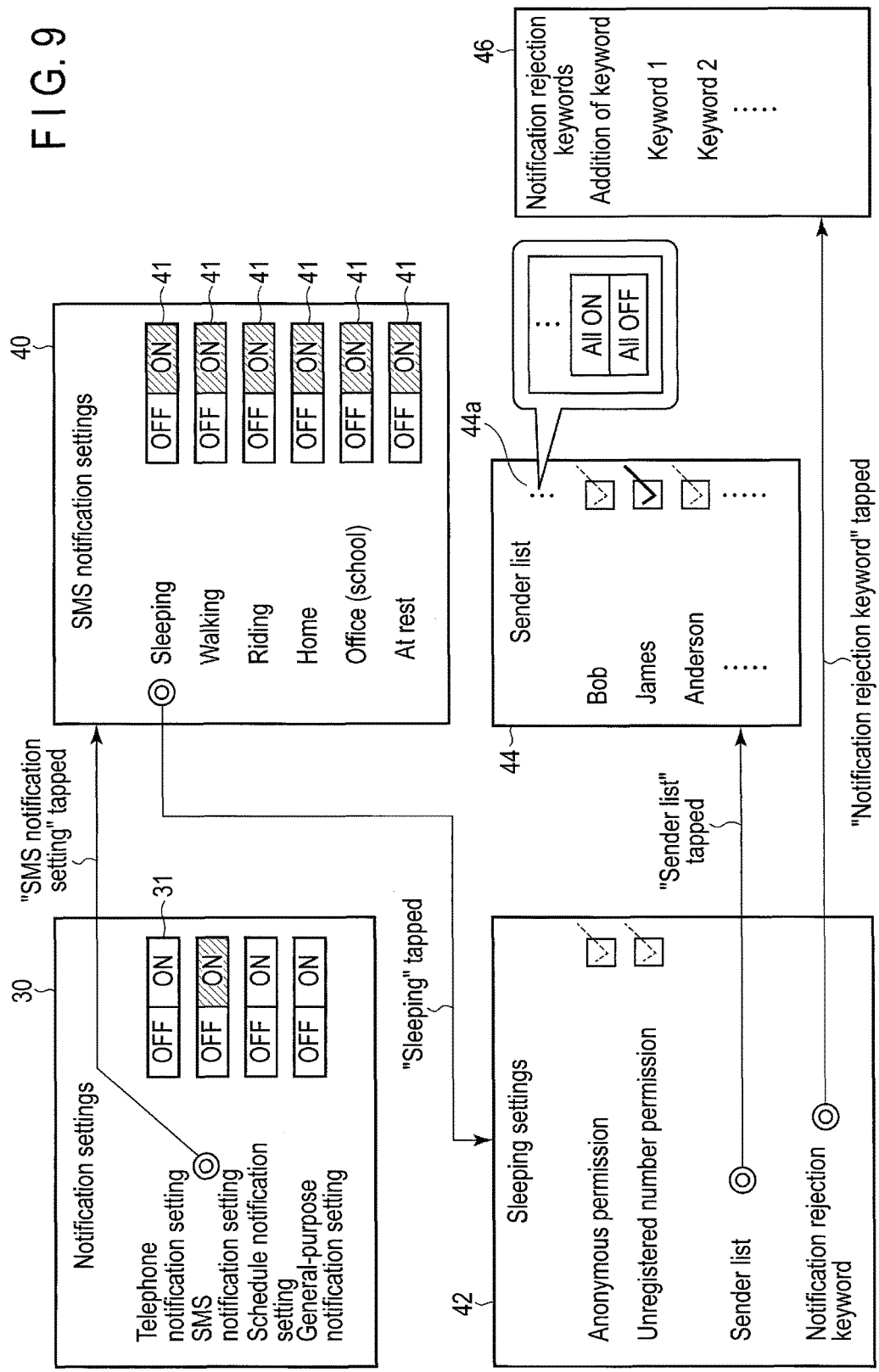
FIG. 9 is an exemplary view illustrating screen transition in the SMS notification setting processing.

FIG. 9 illustrates screen transition in the "SMS notification setting" processing.

When a notification setting item "SMS notification setting" on the notification setting screen 30 is tapped by the user, an SMS notification setting screen 40 is displayed on the display 24 of the mobile device 20. The SMS notification setting screen 40 is a screen for setting the filtering condition concerning position and action for "SMS notification setting" (SMS notification). The SMS notification setting screen 40 displays thereon status items of "sleeping", "walking", "riding", "home", "office (school)", and "at rest". Furthermore, the SMS notification setting screen 40 displays thereon, for each of the status items, a button switch 41 configured to specify ON or OFF. When a certain status item is set to ON, detailed conditions (notification conditions) corresponding to the status item is enabled, and the filtering processing using the detailed conditions (notification conditions) is executed. When a certain status item is set to OFF, notification in a status corresponding to this status item is prohibited.

When the status item "sleeping" is tapped by the user, a sleeping setting screen 42 is displayed on the display 24 of the mobile device 20. The sleeping setting screen 42 displays thereon a setting item of "anonymous permission" used to set whether the user should be notified of call incoming from an anonymous telephone number, a setting item of "unregistered number permission" used to set whether the user should be notified of call incoming from an unregistered telephone number, a setting item of "sender list", and a setting item of "notification rejection keyword". Furthermore, the sleeping setting screen 42 displays thereon a checkbox used to specify enable/disable of "anonymous permission" and a checkbox used to specify enable/disable of "unregistered number permission".

When the setting item of "sender list" is tapped by the user, a sender list setting screen 44 is displayed. The sender list setting screen 44 displays thereon a list of personal names registered in the telephone directory in the mobile device 20. Furthermore, the sender list setting screen 44 displays thereon a checkbox for each of the persons. Personal names corresponding to the checkboxes checked by the user are registered in the aforementioned sender list.

When an options menu 44a on the sender list setting screen 44 is operated by the user, an "all ON" button and an "all OFF" button are displayed. When the "all ON" button is tapped by the user, all the checkboxes corresponding to all the persons on the sender list setting screen 44 are checked. When the "all OFF" button is tapped by the user, all the checkboxes corresponding to all the persons on the sender list setting screen 44 are unchecked.

When the setting item of "notification rejection keyword" on the sleeping setting screen 42 is tapped by the user, a notification rejection keyword setting screen 46 is displayed. The user can add an arbitrary text onto the notification rejection keyword setting screen 46 as a notification rejection keyword.

FIG. 10 illustrates a general-purpose notification setting screen 50. This general-purpose notification setting screen 50 is displayed when the setting item of "general-purpose notification setting" on the notification setting screen 30 of FIG. 6 is tapped. The general-purpose notification setting screen 50 displays thereon a list of application programs installed in the mobile device 20. Furthermore, the general-purpose notification setting screen 50 displays thereon, for each of the application programs, a button switch 51 configured to specify ON (permission) or OFF (prohibition) of notification.

Figure 11:
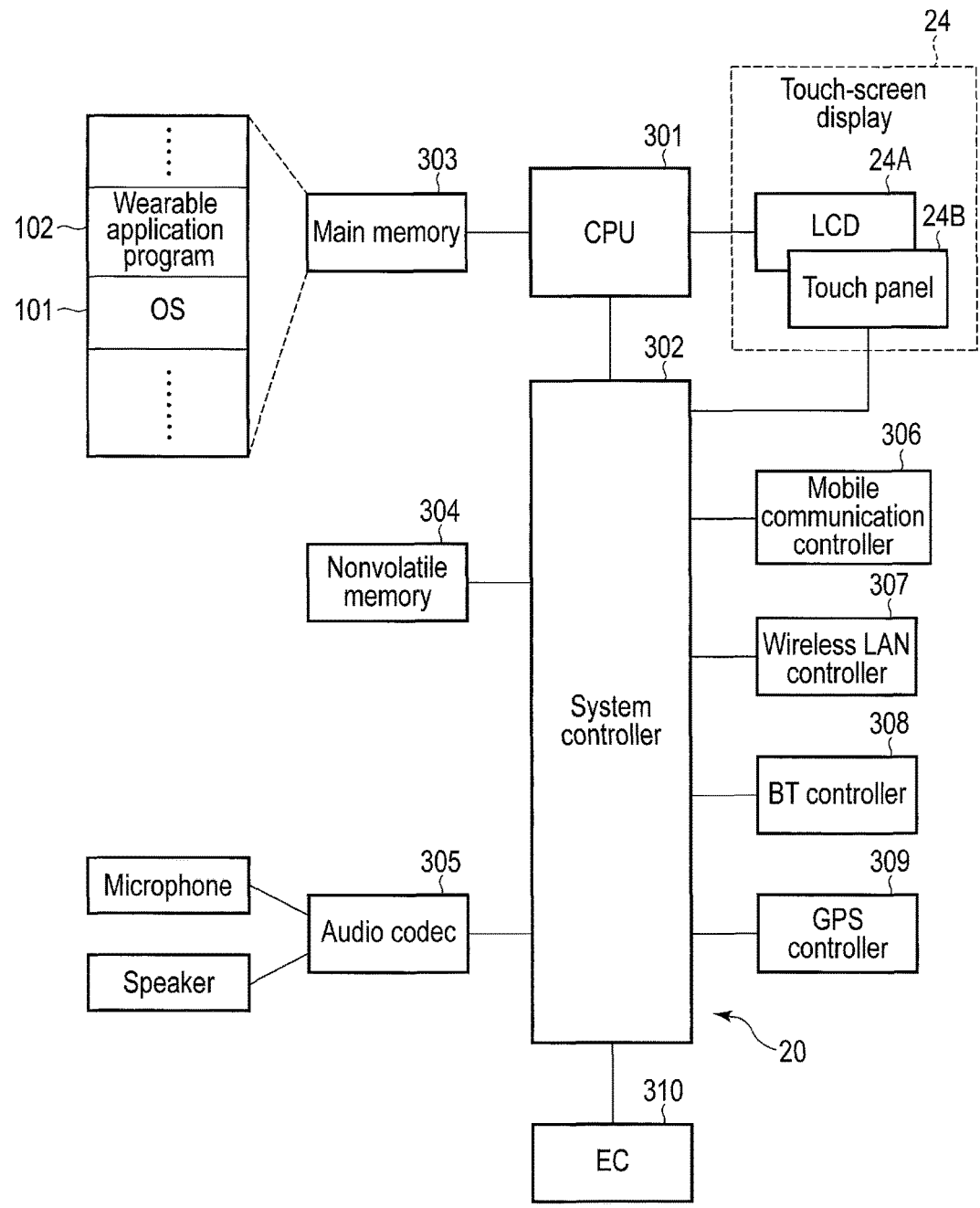
FIG. 11 is an exemplary block diagram illustrating a hardware configuration of the external device.

FIG. 11 illustrates a hardware configuration example of the mobile device 20.

The mobile device 20 includes a CPU 301, a system controller 302, a main memory 303, a nonvolatile memory 304, an audio codec 305, a mobile communication controller 306, a wireless LAN controller 307, a Bluetooth (registered trademark) (BT) controller 308, a GPS controller 309, and an embedded controller (EC) 310.

The CPU 301 is a hardware processor configured to execute various programs loaded from the nonvolatile memory 304 into the main memory 303. Examples of the various programs include the aforementioned operating system (OS) 101, and various application programs. The various application programs include the aforementioned wearable application program 102. As described above, the OS 101 can detect various notification information items including telephone call incoming and message incoming, and display the detected notification information on the display 24.

The CPU 301 incorporates therein a graphics processing unit (GPU). The graphics processing unit (GPU) is configured to control an LCD 24A in the display (touch-screen display) 24. A display signal generated by the GPU is sent to the LCD 24A. The LCD 24A displays thereon a screen image based on the display signal. A touch panel 24B is arranged on the top surface side of the LCD 24A. The touch panel 24B is a capacitance type pointing device configured to perform an input operation on the screen of the LCD 24A. A contact position on the screen at which a finger touches the screen, movement of the contact position, and the like are detected by the touch panel 24B.

The system controller 302 connects the CPU 301 and each component. The mobile communication controller 306 is configured to execute mobile communication such as 3G and LTE. The wireless LAN controller 307 is configured to execute wireless communication of the IEEE 802.11 standard. The BT controller 308 executes near field communication in accordance with the Bluetooth (registered trademark) standard. The BT controller 308 may be used for communication between the mobile device 20 and the wearable device 10. By correlating the mobile device 20 and the wearable device with each other by pairing, the mobile device 20 in which the wearable application program 102 is being executed can operate in cooperation with the wearable device 10. The GPS controller 309 calculates positional information indicative of a position/place of the mobile device 20 based on signals received from GPS satellites. The EC 310 has a function of powering on or powering off the mobile device 20.

FIG. 12 illustrates a hardware configuration example of the wearable device 10.

The wearable device 10 includes, in addition to the aforementioned display 14 and the sensors 201, a controller 401, a main memory 402, a nonvolatile memory 403, a BT controller 404, an LED 405, a vibrator 406, and an embedded controller (EC) 407.

The controller 401 functions as the aforementioned action estimation module 203 and the action type filtering determination module 204. The controller 401 may be realized by a System-on-a-chip (SOC) provided with various functional modules including a CPU 401A. The CPU 401A functions as a hardware processor (one or more cores) configured to execute various programs loaded from the nonvolatile memory 403 into the main memory 402.

These programs include an operating system and various application/utility programs. In the application/utility programs, a notification application program is included. The notification application program is a program for performing the aforementioned status-dependent notification filtering using action.

The controller 401 executes the processing of estimating the action of the user, processing of filtering notification information by using the estimated action and action type filtering information received from the mobile device (host device) 20, and processing of notifying the user of the notification information regarding which it is determined that notification of which should be permitted under the control of the notification application program. In the processing of notifying the user of the notification information, processing of displaying the notification information (notification image data) on the display 14 is executed. Alternatively, in place of the processing of displaying the notification information (notification image data) or in addition to the processing of displaying the notification information (notification image data), processing of turning on the LED 405 or processing of vibrating the vibrator 406 or the like may also be executed.

Next, with reference to a flowchart of FIG. 13, the notification filtering processing to be executed by using instructions included in the wearable application program 102 of the mobile device 20 will be described below.

It is determined whether notification information has been detected in the mobile device 20 by using a communication between the wearable application program 102 and the OS 101 (step S11). For example, when an event such as telephone call incoming, message incoming, and coming of the scheduled date and time has occurred, notification information corresponding to this event is detected by using instructions included in the OS 101. When the notification information is detected (YES in step S11), the notification information is acquired from the OS 101. Then, positional information filtering processing configured to determine whether the user should be notified of the notification information, i.e., whether the notification information should be transmitted to the wearable device 10 is executed based on positional information indicative of the current position of the mobile device 20 and the filtering condition in the filtering rule database 111A (steps S12, S13).

When it is determined that the user should be notified of this notification information, notification type filtering processing is subjected to this notification information (steps S14, S15). In step S14, it is determined whether the user should be notified of this notification information, i.e., whether this notification information should be transmitted to the wearable device 10, based on the filtering condition and a notification type corresponding to this notification information.

When it is determined that the user should be notified of this notification information, the wearable application program 102 transforms this notification information into notification image data (step S16). Thereafter, action type filtering information is added to the notification image data (step S17). In step S17, action type filtering information corresponding to this notification information is created based on the filtering condition. This action type filtering information is information indicating whether the user should be notified of this notification information for each action type. This action type filtering information can be created based on the filtering condition, positional information, and the type of this notification information.

Then, the notification image data and the action type filtering information are transmitted to the wearable device 10 (step S18). In step S18, the notification image data to which the action type filtering information is added is wirelessly transmitted to the wearable device 10 by the BT controller 308.

Next, with reference to a flowchart of FIG. 14, the action type filtering processing to be executed by using the controller 401 of the wearable device 10 will be described below.

Notification image data and action type filtering information are received from the mobile device 20 (step S21). The current action of the user wearing the wearable device 10 is estimated by using the one or more sensors 201 (step S22). In step S22, it is estimated which one of "at rest", "walking", "riding", and "sleeping" is the current action of the user.

Then, the action type filtering processing is executed based on the estimated action and the action type filtering information (steps S23, S24). In the action type filtering processing, it is determined whether the estimated current action of the user is of the action type for which notification of the notification information (notification image data) is permitted.

When the estimated current action of the user is of the action type for which notification of the notification information (notification image data) is permitted, processing for notifying the user of the notification information (notification image data) is executed (step S25). In step S25, the notification image data may be displayed on the display 14. The notification image data corresponding to telephone call incoming/message incoming is image data which can display the telephone number and the name of the sender, and hence the contents of the notification can be presented to the user by only displaying the notification image data. Furthermore, the LED 405 may be turned on or the vibrator 406 may be vibrated.

It should be noted that the processing of estimating the action of the user need not necessarily be executed at the time of reception of the notification information (notification image data) and, for example, the processing of estimating the action of the user may be executed periodically.

As described above, in this embodiment, the notification information and the action type filtering information are transmitted from the mobile device 20 to the wearable device 10. Then, the processing of estimating the action of the user and the action type filtering processing are executed in the wearable device 10. Accordingly, it is possible to execute the action type filtering processing efficiently without transmitting information indicative of the estimation result of the action from the wearable device 10 to the mobile device 20. Therefore, quick notification can be realized by utilizing the cooperation between the wearable device 10 and the mobile device 20.

It should be noted that each of the processing items of this embodiment can be realized by a computer program, and hence it is possible to easily realize an advantage identical to this embodiment by only installing this computer program in the computer through a computer-readable storage medium storing therein this computer program, and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device which can be fitted on a body of a user, the electronic device comprising:
   a hardware processor configured to estimate action of the user by using one or more sensors; and
   a receiver configured to receive first notification information and filtering information from an external device associated with the electronic device, the filtering information indicative of whether the user should be notified of the first notification information for each action type, wherein
   the hardware processor is configured to:
      determine whether the estimated action is of an action type for which notification of the first notification information is permitted based on the estimated action and the filtering information; and
      execute, when the estimated action is of the action type for which notification of the first notification information is permitted, processing for notifying the user of the first notification information.

2. The electronic device of claim 1, wherein
   the filtering information comprises at least one of first information indicative of one or more action types for which notification of the first notification information should be permitted, and second information indicative of one or more action types for which notification of the first notification information should be prohibited.

3. The electronic device of claim 1, wherein
   the filtering information is generated based on a filtering condition set in advance by the user.

4. The electronic device of claim 3, wherein
   the filtering condition defines whether notification of the first notification information should be permitted for each position type of the external device, and defines whether notification of the first notification information should be permitted for each action type of the user.

5. The electronic device of claim 1, wherein
   the first notification information comprises notification information indicative of incoming of a telephone call or a message.

6. The electronic device of claim 3, wherein
   the first notification information comprises notification information indicative of incoming of a telephone call or a message, and
   the filtering condition comprises information used to specify a sender for whom notification of the first notification information should be permitted for each of action types.

7. The electronic device of claim 1, wherein
   the estimated action is one of at rest, walking, riding, and sleeping.

8. The electronic device of claim 1, wherein
   the first notification information received from the external device is image data representing a content of the first notification information, and
   the hardware processor is configured to execute processing of displaying the image data in order to notify the user of the first notification information.

9. A method of notifying a user of first notification information corresponding to first notification detected by an external device by using an electronic device which can be fitted on a body of the user, the method comprising:

transmitting the first notification information and filtering information from the external device to the electronic device, the filtering information indicative of an action type for which notification of the first notification information should be permitted or prohibited;

estimating action of the user in the electronic device by using one or more sensors;

determining, in the electronic device, whether the estimated action is of an action type for which notification of the first notification information is permitted based on the estimated action and the filtering information; and executing, in the electronic device, when the estimated action is of an action type for which notification of the first notification information is permitted, processing for notifying the user of the first notification information.

10. The method of claim 9, further comprising determining, in the external device, whether the first notification information should be transmitted to the electronic device based on positional information indicative of a current position of the external device, wherein when the current position of the external device is a position for which notification of the first notification information is permitted, the first notification information and the filtering information are transmitted from the external device to the electronic device.

11. The method of claim 9, wherein the filtering information comprises at least one of first information indicative of one or more action types for which notification of the first notification information should be permitted, and second information indicative of one or more action types for which notification of the first notification information should be prohibited.

12. A computer-readable, non-transitory storage medium having stored thereon a computer program which is executable by a mobile computer capable of communicating with an electronic device which can be fitted on a body of a user and configured to estimate action of the user by using one or more sensors, the computer program controlling the mobile computer to execute functions of:

acquiring first notification information detected by the mobile computer; and transmitting the first notification information and filtering information indicative of an action type for which notification of the first notification information should be permitted or prohibited to the electronic device, and causing the electronic device to determine whether the user should be notified of the first notification information based on an estimation result of the action of the user.

13. The computer-readable, non-transitory storage medium of claim 12, wherein the computer program controlling the mobile computer to further execute a function of determining whether the first notification information should be transmitted to the electronic device based on positional information indicative of a current position of the mobile computer, and when the current position of the mobile computer is a position for which notification of the first notification information is permitted, the first notification information and the filtering information are transmitted from the mobile computer to the electronic device.

14. The computer-readable, non-transitory storage medium of claim 12, wherein the filtering information comprises at least one of first information indicative of one or more action types for which notification of the first notification information should be permitted, and second information indicative of one or more action types for which notification of the first notification information should be prohibited.

* * * * *